United States Patent [19]
Evkin et al.

[11] 4,065,346
[45] Dec. 27, 1977

[54] ROTER THIN-FILM EVAPORATOR

[76] Inventors: Ivan Frolovich Evkin, bulvar Matrosa Zheleznyaka, 9a, kv. 78; Vladimir Alexandrovich Petrov, Tovarischesky pereulok, 17, kv. 16; Viktor Markovich Olevsky, Leningradsky prospekt, 75a, kv. 91; Vitaly Rafael-Abovich Ruchinsky, Prospekt Mira, 202, kv. 21; Vladimir Semenovich Bushev, Balaklavsky prospekt, 4, korpus 3, kv. 206; Valentin Alexeevich Tatyanchikov, Universitetsky prospekt, 4, kv. 296, all of Moscow, U.S.S.R.

[21] Appl. No.: 635,771

[22] Filed: Nov. 26, 1975

[51] Int. Cl.² .............................................. B01D 1/22
[52] U.S. Cl. .................................. 159/6 R; 159/11 A
[58] Field of Search ............. 159/6 R, 6 W, 9 A, 10, 159/7, 11; 202/236; 203/89; 196/112

[56] References Cited
U.S. PATENT DOCUMENTS

| 1,405,085 | 1/1922 | Zahm | 159/6 W |
|---|---|---|---|
| 3,090,732 | 5/1963 | Pinkwart | 202/236 |
| 3,472,304 | 10/1969 | Evkin | 159/6 R |
| 3,486,743 | 12/1969 | Todd | 159/6 R |
| 3,597,329 | 8/1971 | Brown | 202/236 |
| 3,620,283 | 11/1971 | Brown | 159/15 |

Primary Examiner—Hiram H. Bernstein
Attorney, Agent, or Firm—Haseltine, Lake & Waters

[57] ABSTRACT

An evaporator comprising a device for uniform distribution of liquid over the inner surface of crimps in an upper drum constituted as a plate rigidly secured to a rotor shaft and covering the inner space of the drum so that steam passes through an annular clearance between the outer surface of the drum and a heat-exchanging surface of the casing. A centrifugal separation device comprises sections, each positioned between adjacent drums and having vertically disposed blades for discharging the separated liquid to the device for uniform distribution of liquid over the inner surface of the crimp bulges of a lower drum while separated steam passes into the interior of the drum.

6 Claims, 2 Drawing Figures

ROTER THIN-FILM EVAPORATOR

FIELD OF THE INVENTION

This invention relates to heat exchangers and, in particular, to rotor thin-film evaporators.

The invention may have extensive applications in the chemical, petrochemical, food and pharmaceutical industries in apparatus intended for evaporation, distillation and concentration of thermally unstable materials.

The present invention can be most effectively employed as an evaporator of a vacuum rectifying tower.

BACKGROUND

The demand for thin-film rotor evaporators is explained by the fact that they ensure "mild" conditions for processes of distillation, evaporation, concentration and vaporization making it possible to avoid decomposition and polymerization of the treated materials, especially thermally unstable ones.

Such apparatus is characterized by modest hydraulic friction and little or no hydrostatic head which permits vacuum treatment of materials (under a low pressure, at pressure of up to 1 mm Hg, i.e. lowering the temperature in the apparatus).

Furthermore, the residence time of the materials in these apparatus is relatively short (of the order of 5 to 40 sec.) as compared to other types of evaporators, which allows reduction of the degree of thermal treatment to a minimum.

Thin-film rotor evaporators are unique in that they combine high-intensity heat exchange and short time of residence of treated materials.

To this end, several rotor thin-film evaporators have been designed, wherein the liquid film on the heat-exchange surface of the apparatus is produced by rotor wipers rigidly secured on a power shaft and a 1-2 mm wide clearance is provided between the casing and the wipers.

The above-described apparatus is characterized by a limited surface of heat exchange because of its complicated design, production process, assembly and operation caused by the small clearance between the casing walls and the rotor wipers and by the necessity for dynamic balancing of the rotor to make allowance for the thermal strain of the rotor and the apparatus casing. The apparatus is sensitive to heat and liquid loads; the evaporator is most efficient with large liquid loads, that is separation of liquid drops from the steam flow becomes unreliable and insufficient with 25 to 50 percent of the initial amount of the starting material being discharged from the apparatus.

The problem of increasing the heat-exchange surface has been partially solved by another type of rotor thin-film evaporator wherein the liquid film on the apparatus heat-exchange surface is produced by rotor wipers pivotally mounted on the power shaft and sweeping the surface of the apparatus casing. The design of the apparatus permits building larger evaporators.

However, almost all other disadvantages of the known evaporator are present in this design. Besides, direct contact of the rotor wipers with the heat-exchange surface of the apparatus results in contamination of the material, apart from undesirable wear of the wipers and the casing.

The inner surface of the casing being rubbed by wipers must be thoroughly treated to make it a polished surface. The rotor wipers must be made of abrasion-resistant materials exhibiting good antifriction properties.

The required uniform fit of each wiper to the casing heat-exchange surface demands careful fabrication and assembly of the rotor.

The optimum thickness of the film produced by this method upon the heat-exchange surface is determined by a complex combination of factors, namely physical properties of the liquid on the one hand and the rotational velocity of the rotor, the weight of the wipers, their contact with the heat-exchange surface and the design features of the rotor, on the other hand. The best operating conditions are consequently achieved within a relatively narrow range of pressure upon the liquid by the wipers. If the optimum pressure is exceeded, the wipers may bare the heat-transfer surface (scratch off the film), whereas with lower pressure the liquid may drop through downwards.

The problem of increasing the heat-exchange surface (150-200%), simplification of the apparatus design, its fabrication and operation has been solved to a considerable degree by another design of a rotor thin-film evaporator wherein the liquid film upon the heat-exchange surface is produced without any mixing means. The liquid in this apparatus is distributed by centrifugal force by way of crimped drums mounted on the rotor shaft and perforated to discharge the liquid upon the heat-exchange surface of the apparatus casing.

The designs of the prior art apparatus do not exploit all ways to intensify heat exchange, namely: heat exchange intensification by making use of the entire surface of the apparatus casing over the height of the rotor; and heat exchange intensification by increasing the friction of steam and liquid (downflowing film). The latter shortcoming is accounted for by the fact that the steam formed on the heat exchanging surface is immediately evacuated through the perforations in the bulges of the drum crimps into their inner space.

The design of the device for uniform distribution of liquid over the inner surface of the bulges of the drum crimps is too complicated and bulky. It comprises a cylinder with a cogged base rigidly secured in the casing and disposed over the upper drum, a feeding device constituted as a sleeve secured to the rotor and mounted in the cylinder, its lower portion having radial pipes and a rimmed ring placed under the base of the fixed cylinder and secured in the upper part of the drum. Such design of the distributor involves two irrelevant stages of liquid redistribution, namely: intermediate distribution of the liquid over the inner surface of the fixed cylinder and distribution of the liquid on the drum ring. It should be taken into consideration that during these stages of distribution, the liquid may be carried away by a flow of steam (secondary capture) coming into contact with splashes and drops formed when the liquid is discharged from the feeder radial pipes and splashed from the surface of the fixed cylinder and the distributing ring of the drum.

A device for separating liquid drops from a steam-liquid flow positioned inside the apparatus casing over the upper drum, to be more exact in the annular clearance between the casing and the feeder sleeve, comprises a centrifugal separating device. This device comprises inclined wipers with bent upper edges secured to the rotor and a number of vertical plates secured rigidly and radially to the casing, a concentric ring being mounted over these plates. This device does not secure complete separation of liquid drops. The separation is single-staged and the steam flow passes through the centrifugal separator. The separated liquid drops are thrown from the side edges of the separator wipers to the apparatus wall and the flying liquid drops come into contact with the steam flow entering the separator, whereby secondary capture of the liquid becomes possible. It should be borne in mind that any increase of the separator height, the number of wipers and their spacing involves serious complications due to inadmissible added drag of the apparatus normally operating at a pressure of 1-5 mm Hg.

The apparatus is complicated and expensive to make because of the plurality perforations (thousands or tens of thousands) to be punctured in the depressions of the drum crimps for passing steam from the annular space between a drum and the casing into the inner space of a drum. Besides, the perforations are responsible for a certain amount of drops of liquid being carried away by the steam flow passing to the drum inner space.

SUMMARY OF THE INVENTION

It is one of the principal objects of this invention to provide a rotor thin-film evaporator with intensified heat exchange.

A further object of this invention is to provide a rotor thin-film evaporator with a higher separation efficiency as compared to the known rotor thin-film evaporators of this type.

A still further object of the invention is to provide a rotor thin-film evaporator of a simplier design as compared to the known evaporators of this type.

These and the above objects are achieved by a rotor thin-film evaporator casing with a heat-exchange surface comprising a rotor shaft carrying crimped drums, each being secured to bosses rigidly fastened to the shaft and perforated to discharge liquid to the heat-exchange surface of the casing, a device for uniform distribution of liquid over an inner surface of crimp bulges of each drum and a centrifugal separating device, wherein, in accordance with the invention, the device for uniform distribution of liquid over the inner surface of the crimp bulges of the upper drum comprises a plate rigidly secured to the rotor shaft to cover the inner drum space and let steam pass through an annular clearance between the outer surface of the drum and the heat-exchange surface of the casing, the centrifugal separating device comprising sections each positioned between adjacent drums and having vertically disposed blades intended for the discharge of the separated liquid to the device for uniform distribution of liquid over the inner surface of crimp bulges of the lower drum.

A higher quality of separation is achieved by means of the described apparatus. Drops of liquid in the proposed apparatus are separated from the steam-liquid flow in three stages: in the clearance between the rotor drum and the casing wall (preliminary separation); at the entrance to the centrifugal separating device when the flow turns through 90°; and finally, in each section of the centrifugal separation device positioned between adjoining drums. Each section of the centrifugal separating device passes only a part of the steam generated in the above section of the apparatus and the steam velocity is thus reduced in the separator making its operation conditions much easier.

Each section of the centrifugal separating device positioned between adjoining drums has vertically and radially mounted blades intended for the discharge of the separated liquid to the device for uniform distribution liquid over the inner surface of crimp bulges of the lower drum.

The apparatus needs no additional height to accommodate the sections of the centrifugal separating device (non-operating portion of the apparatus) since the available gaps between drums (constructional) are more than sufficient for the purpose.

The rotor length and overall dimensions of the apparatus working part being the same, the heat-exchange surface of the proposed evaporator is larger by 20-25 percent. The intensification is due to the design wherein use is made of the upper part of the apparatus previously housing the centrifugal separating device, the pipe connection to discharge secondary steam and the device for uniform distribution of the liquid over the inner surface of crimp bulges of the upper drum. In this case this device is located in the upper part of the drum and made as a plate, whereas the centrifugal separating device is made of sections and positioned between adjoining drums.

It is expedient, in accordance with the invention, that a plate be provided with a depression in the form of a cylindrical cavity covered by a concentric ring with an internal diameter smaller than the minor diameter of the cylindrical cavity and in contact its outer circumference with the inner surface of the drum crimps.

The proposed evaporator has a simplier design of the device for uniform distribution of liquid over the inner surface of crimp bulges of the upper drum since it comprises but one element, namely the aforesaid plate. A circular bead formed by the ring over the cylindrical cavity forms the liquid into a vertical concentric layer equal to the bead width, thus securing uniform flow of the liquid over the inner edge of the concentric ring along its periphery and its further distribution over the ring surface as a uniform film. Furthermore, the plate covers the space of the upper drum preventing steam penetration from above and it constraining to pass through the annular clearance between the outer drum surface and the casing heat-exchange surface.

The blades, in accordance with the invention, are secured by their ends in the bosses of adjoining drums their cross-section being curvilinear and their outer edges are bent inwardly.

The separated liquid is, therefore, not thrown into the entering steam flow from the surface of the blades. The separated liquid collects in the folds of the vertical outer blade edges and flows as uninterrupted streams to the device for uniform distribution of liquid over the inner surface of the lower drum. Such construction of the centrifugal separating device rules out the possibility of secondary capture of the liquid by the steam current.

It has proven to be more effective technologically to make the drum crimps continuous.

The the drum structure and the production process become much simpler. Furthermore, the labor consuming operation of perforating intricately shaped drum walls is eliminated.

The crimped drum having continuous crimp recesses operates, apart from its basic purpose of distributing the liquid over the heat-exchange surface, as a preliminary separator and provides conditions for letting steam pass through the clearance between the drums and the casing wall of the apparatus.

The process of heat-exchange is intensified at the expense of increased friction of steam against liquid (film) due to the axial steam movement in the annular clearance between the drums and the wall of the apparatus casing.

This can be achieved because the upper drum space is covered from above by the plate and the crimp recesses of the drums are uninterrupted.

BRIEF DESCRIPTION OF THE DRAWING

The invention will now be described in greater detail with reference to a specific embodiment thereof, taken in conjunction with the accompanying drawings, wherein.

DETAILED DESCRIPTION

Figure 1:
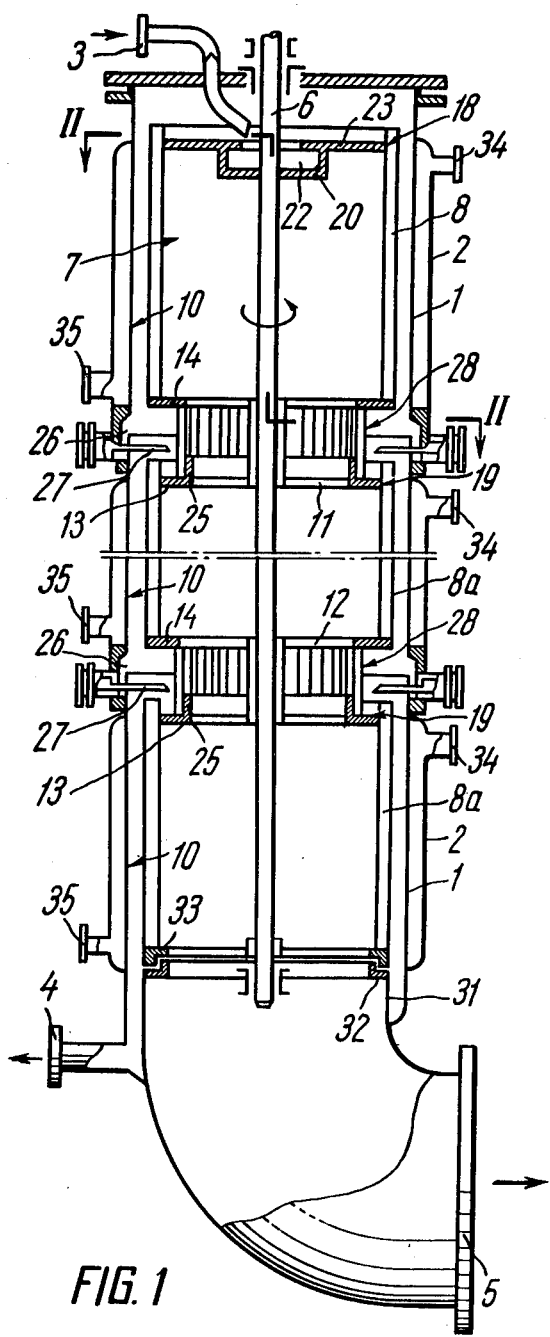
FIG. 1 is a longitudinal elevation view, partly broken away and in section, of a thin-film evaporator in accordance with the invention.
Figure 2:
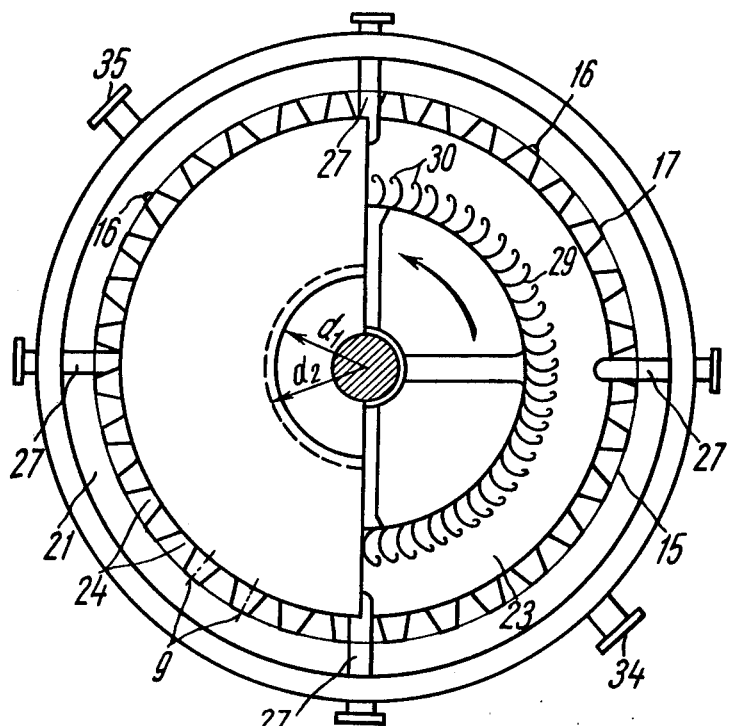
FIG. 2 is a sectional view taken along line II—II of FIG. 1.

The rotor thin-film evaporator illustrated in FIG. 1 comprises a vertically installed, externally heated casing 1 with jackets 2 and pipe connections 3,4,5 for respectively feeding the starting material for, discharge of the tower residue (or concentrated solution), and for outlet of secondary steam. Inside the casing 1, there is mounted a shaft 6 of a rotor 7, carrying crimped drums 8 and 8a with perforations 9 (FIG. 2) for discharging the liquid onto a heat-exchange surface 10 (FIG. 1) of the casing 1. The drum 8 and 8a are secured at their ends to bosses 11 and 12 rigidly fastened to the shaft 6. The drums are secured to rings 13 and 14 of the upper and lower respective bosses 11 and 12 by means of bands 15 (FIG. 2) and screws 16. The walls of the drums 8 and 8a are longitudinally crimped or corrugated to divide the liquid supplied to their inner surface into separate streams freely flowing by gravity along the inner surface of crimp bulges 17 wherein the performations 9 serve to eject the liquid onto the heat-exchange surface 10 of the casing 1. The shaft 6 of the rotor 7 carries devices 18 and 19 for effecting uniform distribution of liquid over the inner surface of crimp bulges 17 of each of the drums 8 and 8a and a centrifugal separating device.

The device 18 for uniform distribution of liquid over the inner surface of the crimp bulges 17 of the upper drum 8 is constructed, in accordance with the invention as, a plate 20 rigidly secured to the shaft 6 of the rotor 7, positioned at the upper part of the drum 8 and fastened thereto by the band 15 and the screws 16. The plate 20 covers the interior space of the drum 8 from above so that steam can pass through an annular clearance 21 (FIG. 2) between the outer surface of the drums 8 and 8a and the heat-exchange surface 10 of the casing 1. The plate 20 has a depression made as a cylindrical cavity 22 (FIG. 1), and the cavity is covered by a concentric ring 23 having an internal diameter $a_1$ (FIG. 2) smaller than the diameter $a_2$ of the cylindrical cavity 22. The outer circumference of ring 23 contacts on the inner surface of crimp recesses 24 of the drum 8. Due to the presence of a circular bead of ring 23 over the cylindrical cavity 22, a vertical concentric layer of the liquid is formed thereunder equal to the bead width to provide uniform flow of the liquid over the inner edge of the concentric ring 23 along its periphery and its further distribution over the surface of the ring 23 as a uniform film discharged to the inner surface of the crimp bulges 17 of the drum 8.

Additionally, the plate 20 completely covers the space of the interior upper drum 8 preventing steam penetration into the interior space of the drum from above and providing conditions for steam passage through the annular clearance 21 between the outer surface of the drums 8 and 8a and the heat-exchange surface 10 of the casing 1.

The device 19 for uniform distribution of liquid over the inner surface of the crimp bulges 17 of the lower drums 8a comprises the ring 13 of the upper boss 11 in contact along its periphery with the recesses 24, whereas the inner edge of the ring 13 is provided with a rim 25 preventing the liquid from flowing into the interior space of the drum 8a.

The evaporator casing 1 houses annular collectors 26 with grooves 27 placed between the adjoining drums 8 and 8a to let the liquid flow from each upper section to the ring 13 of the device 19 for uniform distribution of liquid over the inner surface of the crimp bulges 17 of each lower drum 8a.

The centrifugal separating device comprises, in accordance with the invention, sections 28, each being positioned between the drums 8 and 8a and the adjoining lower drums 8a and 8a. The device comprises vertically and radially mounted blades 29 (FIG. 2) intended to discharge the separated liquid to the device 19 for uniform distribution of liquid over the inner surface of crimp bulges 17 of the lower drum 8a. The blades 29 are spot welded at their ends to the bosses 13 and 14 of each of the adjoining drums 8, 8a and 8a and are curvilinear in cross section. The blades 29 have outer edges 30 bent inwardly. The ring 14 of the lower boss 12 covers the space of each drum 8 and 8a from below and the ring 13 of the upper boss 11 covers the space of each drum 8a from above so that steam can enter the space of the drums 8 and 8a only between the blades 29 of the centrifugal separating device of each section 28.

Reliable separation is thus achieved and the separated liquid is not thrown from the surface of the blades 29 by centrifugal force into the incoming steam flow, but collects in the folds of the vertical outer edges 30 of the wipers 29 and flows as uninterrupted streams to the device 19 for uniform distribution of liquid over the inner surface of crimp bulges 17 of the lower drum 8a. The interior space of the lower drum 8a is separated from the circular space between the drums 8 and 8a and the casing 1 by a lock. The lock is formed by a ferrule 31 secured to the casing 1, its upper part carrying a ring 32 with a rim along its inner periphery coupled with a lower ring 33 of the lower drum 8a, having a rim along the outer diameter of the ring 33.

Pipe connections 34 serve to feed the heat carrier (steam) into the jackets 2 of the evaporator and pipe connections 35 discharge the condensate.

The evaporator operates as follows.

The starting material is fed through the pipe connection 3 (FIG. 1) into the cylindrical cavity 22. When the rotor 7 revolves, the liquid rises on its walls by centrifugal force form a vertical layer equal to the bead width. The liquid flows over the inner edge of the concentric ring 23 along its periphery and spreads evenly over its surface as a film to be discharged at its outer edge to the inner surface of the crimp bulges 27 of the drum 8 wherein it is divided into separate vertical streams flowing freely by gravity to the perforations 9 disposed at different elevations on the drum 8. The streams of the liquid are thrown through the perforations 9 against the heat-exchange surface 10 of the casing 1, wherein they form a downward film permanently turbilized by streams of the liquid. A part of the liquid evaporates on the heat-exchange surface 10 and the unvaporized liquid flows down into the ring collector 26 and then via the grooves 27 passes to the distributing ring 13 of the lower drum 8a. The liquid is further urged by gravity from the ring 13 to the inner surface of the crimp bulges 17 of the drum 8a wherein the cycle is repeated. The concentrated solution (or tower residue) is discharged through the connection 4 and the steam generated by the liquid evaporation moves downwards in the annular clearance 21 between the outer surface of the drums 8 and 8a and the heat-exchange surface 10 of the casing 1 of the evaporator. Due to the friction of steam against liquid, the heat-exchange process is intensified. During its movement, the steam is partially (preliminarily) separated in the annular clearance 21 and at the entrance to each section 28 of the centrifugal separating device when turning 90°. After that, the partially separated steam passes through the centrifugal separation device wherein it is cleared completely of liquid drops in each of the sections 28 and enters the interior space of lower drums 8a to be later discharged from the evaporator through the pipe connection 5. The separated liquid is discharged from the surface of the blades 29 by the centrifugal force to the folds of the vertical outer edges 30 of the blades 29, collects there and flows by gravity as uninterrupted streams to the ring 13 of the lower drum 8a and to the inner surface of the crimp bulges 17.

What is claimed is:

1. A rotor thin-film evaporator comprising: a cylindrical casing with an inner heat-exchange surface; heating jackets mounted outside the casing; a rotor including a shaft; a plurality of crimped drums arranged successively along said shaft; bosses rigidly secured to said shaft, each of said crimped drums being secured to said bosses; each of said drums having peripheral surfaces with perforations therein for ejecting liquid fed to the crimps of said drums to the heat-exchange surface of said casing whereat steam is generated by vaporization of some of said liquid; an annular clearance being provided between the outer surface of each of the drums and the heat-exchange surface of the casing; means for uniformly distributing inlet liquid over the inner surface of the crimp bulges of the uppermost drum comprising a plate secured to the shaft of said rotor and covering the interior space of the drum from the top such that the steam is constrained to pass through said annular clearance; means for uniformly distributing liquid received from the uppermost drum successively to the inner surface of the crimp bulges of each of the lower drums; means for separating liquid drops from the stream of steam and liquid coming from said annular clearance at said uppermost drum comprising a section disposed between adjoining drums and including blades extending vertically and radially and having curvilinear cross-sections with vertical outer edges bent inwardly for discharge of separated liquid from the blades to said means for distributing the liquid to the inner surface of the crimp bulges of the lower drum while directing steam separated from liquid into the drum cavity.

2. A rotor thin film evaporator as claimed in claim 1, wherein said plate has a depression constituted as a cylindrical cavity and a cover constituted as a concentric ring, said ring having an inner diameter smaller than the inner diameter of said cylindrical cavity and an outer peripheral surface in contact with the inner surface of crimps of the drum.

3. A rotor thin-film evaporator as claimed in claim 1, wherein said crimp recesses are continuous.

4. A rotor thin-film evaporator as claimed in claim 1, wherein the cavity in said drums successivley communicate with one another, said evaporator further comprises means for discharging steam from the cavity of the lowermost drum.

5. A rotor thin-film evaporator as claimed in claim 4, wherein the means for distributing liquid from the uppermost drum successively to the lower drums comprises an annular collector interposed between adjacent drums and having grooves for feeding accumulated liquid received from said annular clearance of the upper one of the adjacent drums to the crimp bulges of the lower one of the adjacent drums.

6. A rotor thin-film evaporator as claimed in claim 5, wherin one respective separating means is disposed adjacent one respective distributing means between each pair of adjacent drums such that a stream of liquid and steam coming from the annular clearance between the upper ones of the adjacent pairs of drums and the casing pass to said separating means whereat steam is passed into the interior of the drums and flows in succession to the means for discharging steam.

* * * * *